United States Patent [19]

Rieck et al.

[11] 4,378,341
[45] Mar. 29, 1983

[54] PROCESS FOR THE MANUFACTURE OF AMMONIUM NITRILOTRISULFONATE

[75] Inventors: Hans-Peter Rieck; Jürgen Russow, both of Kelkheim; Hans-Joachim Semmler, Hochheim am Main, all of Fed. Rep. of Germany

[73] Assignee: Hoechst Aktiengesellschaft, Frankfurt am Main, Fed. Rep. of Germany

[21] Appl. No.: 259,966

[22] Filed: May 4, 1981

[30] Foreign Application Priority Data

May 5, 1980 [DE] Fed. Rep. of Germany ....... 3017172

[51] Int. Cl.³ .......................................... C01B 21/093
[52] U.S. Cl. .................................................. 423/388
[58] Field of Search ................................ 423/388, 389

[56] References Cited

U.S. PATENT DOCUMENTS

| | | | |
|---|---|---|---|
| 1,922,283 | 8/1933 | Dering | 23/304 |
| 3,375,066 | 3/1968 | Murakami et al. | 423/166 |
| 3,625,649 | 12/1971 | Hofmeister et al. | 423/389 |
| 4,229,423 | 10/1980 | Housh et al. | 423/164 |

FOREIGN PATENT DOCUMENTS

| | | | |
|---|---|---|---|
| 16430 | 10/1980 | European Pat. Off. | 423/389 |
| 5051705 | 10/1978 | Japan | 423/388 |
| 55-48004 | 4/1980 | Japan | 423/388 |
| 676956 | 8/1952 | United Kingdom | 423/388 |

*Primary Examiner*—O. R. Vertiz
*Assistant Examiner*—Wayne A. Langel
*Attorney, Agent, or Firm*—Curtis, Morris & Safford

[57] ABSTRACT

Ammonium nitrilotrisulfonate is obtained by introducing nitric oxides into an aqueous ammonium sulfite solution at a pH of 5.0–7.5. The solution should contain at least 20 g/l of ammonium nitrilotrisulfonate in suspended form.

6 Claims, 1 Drawing Figure

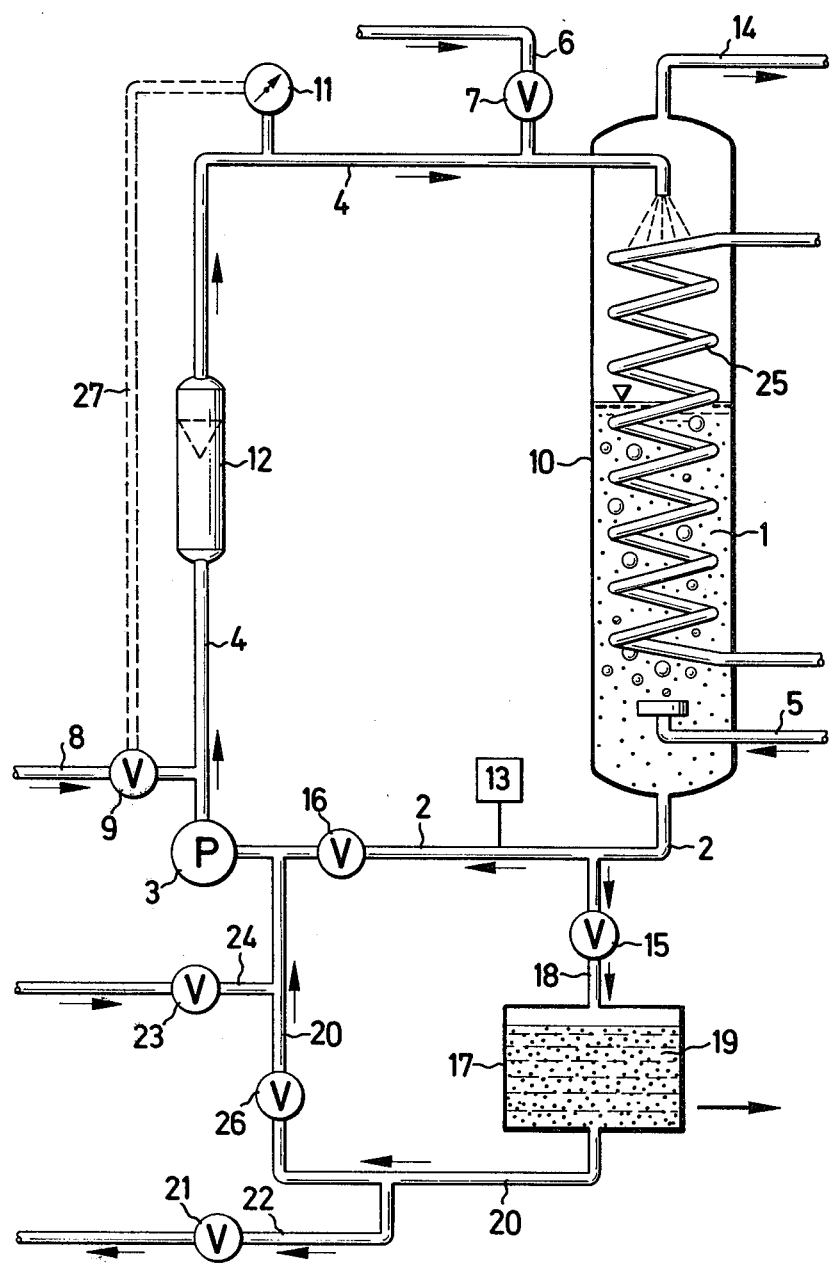

PROCESS FOR THE MANUFACTURE OF AMMONIUM NITRILOTRISULFONATE

The present invention relates to a process for the manufacture of ammonium nitrilotrisulfonate from ammonia, sulfur dioxide and nitrose-containing gases.

German Auslegeschrift No. 1,767,201 proposes a process for the manufacture of ammonium nitrilotrisulfonate which involves reacting an aqueous ammoniacal ammonium sulfite solution at pH 5.0–7.5 with gaseous nitric oxides at elevated temperature. The precipitating ammonium salt of the nitrilotrisulfonic acid, which is still contaminated by a small quantity of ammonium imidodisulfonate and ammonium sulfamate is separated. This process exhibits disadvantages in that complicated apparatus are required to yield only small quantities of nitrilotrisulfonate, great quantities of liquid have to be filtered and fine nitrilotrisulfonate crystals may be formed in the apparatus even after separation of the precipitate.

It is an object of the present invention to provide a process for the manufacture of ammonium nitrilotrisulfonate which permits the manufacture of large quantities of ammonium nitrilotrisulfonate with low equipment cost and a small reactor volume. In particular, by this invention a continuous operation mode can be achieved and waste gases with varying of sulfur dioxide and nitric oxide content can be used.

A process has now been found for the manufacture of ammonium nitrilotrisulfonate in which nitric oxides are introduced into an aqueous ammonium sulfite solution at pH 5.0–7.5, which comprises introducing the nitric oxides into a solution containing at least 20 g/l of ammonium nitrilotrisulfonate in suspended form.

The gaseous nitric oxides may also be nitric oxide-containing off-gases, particularly as obtained in nitric acid manufacture.

The degree of oxidation of the nitric oxide-containing gases used should be preferably between 30 and 60%. It is preferred to adjust the pH at the indicated range by the addition of oxygen or nitrogen monoxide to obtain nitrilotrisulfonate at optimal yield.

By degree of oxidation (expressed in %) there is to be understood the molar ratio $[NO_2/(NO+NO_2)] \times 100$. A higher degree of oxidation results in undesired formation of ammonium sulfate and ammonium nitrate.

The reaction may be carried out at a temperature in the range of from 0° to 80° C. The yield of trisulfonate is reduced rapidly at higher temperatures due to progressive hydrolysis. The solubility of ammonium sulfite is low at a temperature of about 0° C. so that sulfite may precipitate. A reaction temperature of 30° to 70° C. and a pH of 6.0–7.0 are preferred.

The process of the invention requires no separate crystallization vessels, since the quantity of aqueous solvents to be filtered off is lower than in known processes resulting in high space-time yields. It is furthermore surprising that the hydrolysis of trisulfonate yielding imidodisulfonate and sulfate which competes with the synthesis of trisulfonate is not increased although the process is carried out in the presence of increased quantities of ammonium nitrilotrisulfonate.

It is possible to remove the precipitated nitrilotrisulfonate from the suspension by simple means at the same rate as it is formed thereby maintaining a constant concentration. A preferred operation mode consists in withdrawing continuously a certain amount of the suspension, separating therefrom the solid nitrilotrisulfonate completely or partially and recycling the aqueous phase into the reaction vessel. For example the gases may be fed to a cooling vessel with a stirrer and the suspension to be filtered may be withdrawn at the bottom. The nitrose is advantageously fed to the vessel at a low level.

A further possible operation mode is as follows: A certain quantity of suspension is withdrawn from the reaction vessel, even if the content of solid nitrilotrisulfonate therein is below 20 g/l, the precipitated nitrilotrisulfonate is completely removed from part of the suspension withdrawn, the mother liquor obtained is combined completely or partially with the residual part of the suspension withdrawn and the solution obtained is recycled to the reaction vessel. In this manner there will always be nitrilotrisulfonate in suspended form in the recycled solution.

In a continuous operation mode, fresh ammonium sulfite solution is added or new ammonium sulfite is produced continuously in the suspension at the same rate as ammonium sulfite is consumed by the reaction, which may be represented by the following equation:

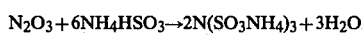

$$N_2O_3 + 6NH_4HSO_3 \rightarrow 2N(SO_3NH_4)_3 + 3H_2O$$

After fairly long reaction times it may be advisable to withdraw part of the reaction solution and to replace it by fresh ammonium sulfite solution, in order to limit the concentration of contaminants (sulfate, nitrate, disulfonate) resulting from side reactions. Even in this case it is sufficient to remove up to 5 liters of mother liquor from the reaction system per kg of separated nitrilotrisulfonate.

The quantity of mother liquor to be filtered after separation of the solid nitrilotrisulfonate may be kept particularly low, when proceeding in the following manner: The suspension previously withdrawn is introduced into a decantation vessel, the suspension enriched in solids is withdrawn at the lower part of the decantation vessel and nitrilotrisulfonate is completely separated therefrom, leaving a mother liquor.

A suspension having a reduced content of solids is simultaneously withdrawn at the upper part of the decantation vessel, which suspension is recycled to the reaction vessel, after the mother liquor is added thereto.

The reaction vessel, into which the nitric oxides are introduced, contains in general of from 20 to 800 g/l, preferably 100 to 500 g/l, of solid ammonium nitrilotrisulfonate. The suspension becomes very pasty beyond a solids content of 800 g/l and can be mixed only with great difficulty. Solids contents of below 20 g/l are advantageous as compared to the process wherein nitrose is introduced into a clear ammonium sulfite solution. Concentrations above 20 g/l are, however, preferred to achieve good crystal formation and a simple separation of the reaction product. The suspension diluted with mother liquor, which is recycled to the reaction vessel, should preferably have a content of solid nitrilotrisulfonate at from 18 to 700 g/l.

The sulfur dioxide content of the suspension in the reaction vessel should be in the range of from 4 to 400 g/l of suspension, the term "sulfur dioxide" referring to $SO_2$ dissolved in the aqueous phase as well as $SO_2$ bound in the form of the sulfite. $SO_2$ contents of from 20 to 300 g, particularly of from 50 to 200 g, per liter of suspension, are preferred.

An upper limit of the $SO_2$ content is given by the solubility of ammonium sulfite and ammonium bisulfite in the reaction solution at the reaction temperature chosen. On the other hand, concentrated ammonium sulfite solutions exhibit better buffer action than highly diluted solutions. Inconsistent concentrations of the reactants ($NO_x$, $SO_2$) will therefore provoke a greater change in pH-value in thin solutions than in concentrated solutions, if both have the same pH value. When observing the reaction carefully, the process of the invention may still be carried out, when the sulfur dioxide concentration of the suspension is below 20 g per liter. In the case of very low $SO_2$ concentrations in the suspension it is, however, difficult to maintain the pH range of from 5.0 to 7.5, particularly the preferred pH range of from 6.0 to 7.0, at the inlet zones of the reactants. It is therefore advisable to stir the suspension vigorously in the case of low $SO_2$ contents.

The hydrolysis proceeding according to the following equations, i.e.,

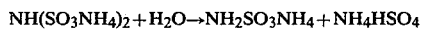

$$N(SO_3NH_4)_3 + H_2O \rightarrow NH(SO_3NH_4)_2 + NH_4HSO_4$$

$$NH(SO_3NH_4)_2 + H_2O \rightarrow NH_2SO_3NH_4 + NH_4HSO_4$$

will proceed more rapidly when the pH drops below the range of from 5 to 7.5. In the case of a particularly small buffer capacity it is even possible that the decomposition caused by the protons formed during hydrolysis is accelerated autocatalytically and that the suspension is converted into a clear solution while increasing in temperature and destroying the nitrilotrisulfonate.

The reaction may be carried out easily in a continuous manner, if the feed rate of nitrose in the case of a given $SO_2$ inlet rate is adjusted such that the $SO_2$ content remains approximately constant and the addition of sulfur dioxide and ammonia is controlled via the pH value, preferably automatically. When the pH drops below a given limit, ammonia or ammoniacal water is metered into the reaction vessel or into the repumped suspension. The $SO_2$ content may be determined easily by iodometric titration.

This possibility of easily monitoring the process of the invention permits the use of highly diluted ammonia, sulfur dioxide or nitric oxide, for example as obtained in waste gases. Ammonia- or sulfur dioxide-containing effluent waters may also be used, if desired. Periodic variations of the gas concentrations may be taken into account in this case.

The invention will be illustrated, by way of example, in the accompanying drawings, representing a flow scheme of the process of the invention, in the description referring thereto and in the example describing the test.

The apparatus used consists substantially of a vertically arranged bubble column (10) provided with a cooling coil (25), conduits for withdrawing and recycling the suspension and means for withdrawing humid nitrilotrisulfonate. Columns may be used moreover for absorption purposes in the case of short reaction times and low gas concentrations.

Water or ammonium sulfite solution is added to the bubble column (10) at the beginning of the reaction. This solution is withdrawn via pipe (2) at the bottom of column (10) and recycled to the upper portion of the bubble column via pump (3) and pipe (4). $SO_2$ is added via pipe (6) and valve (7) and ammonia is added via pipe (8) and valve (9). Valve (9) remains open until the pH, measured by the measuring means (11), has attained a predetermined value. The flow rate is monitored by the flow meter (12) and the temperature is monitored by the thermometer (13). The measuring means (11) adjusts valve (9) by means of the pneumatic valve (27).

Nitric oxide-containing gas ($NO_x$) is introduced into the repumped liquid at the bottom of column (10) via pipe (5) after the required pH value and $SO_2$ concentration have been attained. Inert gases (for example nitrogen, argon or oxygen) leave the column (10) at the top via pipe (14). When sufficiently great quantities of solid nitrilotrisulfonate have formed in the sulfite solution, part of the suspension (1) is withdrawn via pipe (18) by opening valve (15) and throttling valve (16) and is subsequently filtered to remove solid nitrilotrisulfonate by the suction filter (or centrifuge) (17). The filter cake (19) is removed from the filter and the mother liquor is combined via pipe (20) with that part of the suspension that has not been filtered and which flows through pipe (2). A certain amount of mother liquor may be withdrawn via pipe (22) after fairly long reaction times by closing valve (26) and by opening valve (21), while feeding fresh water or fresh ammonium sulfite solution to the column via valve (23) and pipe (24).

The cooling coil (25) is irrigated partially when applying the suspension (1) to the bubble column at the top thereof, without the formation of sticky nitrilosulfonate on the surface of the coil being observed.

Nitrilotrisulfonate precipitating at the beginning of the reaction is very pure. However, the concentration of the by-products increases with increasing time of reaction. These by-products consist substantially of the ammonium salt of imidodisulfonic acid, of ammonium bisulfate and of ammonium sulfate. Part of the impurities precipitate together with nitrilotrisulfonate. Equilibrium conditions are reached after some time, whereupon the composition of the solids no longer changes. However, the solids always contain a great amount of nitrilotrisulfonate. Mother liquor should be discharged, preferably via pipe (22), when a crystallization of pure nitrilotrisulfonate is desired. This mother liquor contains relatively small amounts of dissolved nitrilotrisulfonate. The liquid volume in the reaction vessel is kept constant by adding water or ammonium sulfite solution.

Aqueous mists are discharged together with the inert gas leaving the bubble column (10) via pipe (14), these mists containing ammonium salts (in particular ammonium nitrate and ammonium sulfate). These mists may be precipitated in known manner.

The salt solutions thus obtained are withdrawn preferably and processed, for example to yield a nitrate fertilizer.

The ammonium nitrilotrisulfonate obtained by the process according to the present invention is filtered, whereupon it may be washed with a small quantity of water, highly dilute aqueous ammonia solution and an organic solvent miscible with water such as acetone, and dried. The product is advantageously dried immediately after having been filtered, optionally in vacuo.

Ammonium nitrilotrisulfonate may be used as a builder in washing agents like the corresponding alkali metal salts of nitrilotrisulfonic acid. Nitrilotrisulfonate may furthermore be converted by ammonolysis under pressure and at elevated temperature to yield ammonium sulfamate, which latter is a precursor of amidosulfonic acid.

EXAMPLE 1

For the absorption there is used the apparatus illustrated schematically in the flow scheme. This apparatus has a volume of 20 liters (bubble column about 7 liters) and is charged with 15 liters of dilute ammonium sulfite solution. The solution is pumped through the apparatus at a rate of 1,000 l/h. The pH is first adjusted to 6.7 by introducing ammonia and sulfur dioxide and the $SO_2$ content is adjusted to 143 g/l. The valves for the introduction of ammonia and sulfur dioxide are monitored by the pH meter. The pH is in the range of from 6.5 to 6.9 during the entire test period. In this manner there are introduced per hour of from 0.9 to 1.1 kg of ammonia, of from 2.5 to 3.0 kg of sulfur dioxide and of from 2.5 to 3.5 m³ of nitrose-containing gases (content of $NO_x$ about 10%, remainder air). The $SO_2$ content in the suspension is determined about every half hour by iodometric titration and is found to be between 100 and 170 g/l.

At the beginning of the reaction the ammonium sulfite solution has a density of 1.1 g/cc. After prolonged reaction times the density is increased to a value of from 1.33 to 1.35 g/cc (referring to the clear solution liberated from the solids). The temperature is maintained at 48° to 52° C. by cooling. The ammonium salt of the nitrilotrisulfonic acid starts to crystallize in pure form about 25 minutes after the beginning of the reaction. The suspension becomes somewhat pasty with an increasing solids content. As soon as the solids content has attained 450 g/l (density of the suspension 1.465 g/ml), there are withdrawn per hour about 10 liters of suspension and subsequently filtered. The mother liquor is recycled, the solids are dried in vacuo, while separating therefrom together with the water volatile ammonium salts.

The solids obtained contain in addition to nitrilotrisulfonate small amounts of other ammonium salts. During the precipitation of the aqueous salt mists, which latter are discharged at the top of the column, there is obtained a solution containing mainly ammonium nitrate and ammonium sulfate (content per liter: 159 g of $NO_3^-$, 159 g of $SO_4^{--}$ and 100 g of $NH_4^+$). To maintain a constant liquid level constant it is therefore necessary to add to the suspension a quantity of water greater than that expected by the formation equation.

48.5 kg of ammonium nitrilotrisulfonate were prepared within 11.6 hours from 11.4 kg of ammonia, 32 kg of sulfur dioxide, 26 liters of water and 33.3 m³ of nitrose-containing gases.

What is claimed is:

1. In a process for the manufacture of ammonium nitrilotrisulfonate in a reaction vessel by reacting an aqueous ammonium sulfite solution having a pH in the range of 5.0 to 7.5 with gaseous nitric oxides the improvement which comprises maintaining a suspension in said sulfite solution of 20 to 800 g/l of solid nitrilotrisulfonate by continuously withdrawing from said reaction vessel a portion of said suspension, removing from a portion of said withdrawn suspension the solid nitrilotrisulfonate therein to form a mother liquor free of solid nitrilotrisulfonate and recycling at least a portion of said mother liquor together with the remaining portion of said withdrawn suspension containing nitrilotrisulfonate to the reaction vessel.

2. The process of claim 1 wherein fresh ammonium sulfite solution is added to the reaction vessel at a rate equal to the rate at which ammonium sulfite is consumed by the reaction.

3. The process of claim 1, wherein the suspension contains from 100 to 500 g/l of solid nitrilotrisulfonate.

4. The process of claim 1, wherein that portion of said withdrawn suspension being recycled to the reaction vessel contains 18 to 700 g/l of solid nitrilotrisulfonate.

5. The process of claim 1, wherein the suspension contains from 4 to 400 g/l of free or bound sulfur dioxide.

6. The process of claim 1, wherein the nitric oxides are introduced into said sulfite solution having a temperature in the range of 0° to 80° C.

* * * * *